March 14, 1944. H. REISSNER 2,344,266
AIRCRAFT PROPELLER CONSTRUCTION
Filed June 27, 1941 3 Sheets-Sheet 1
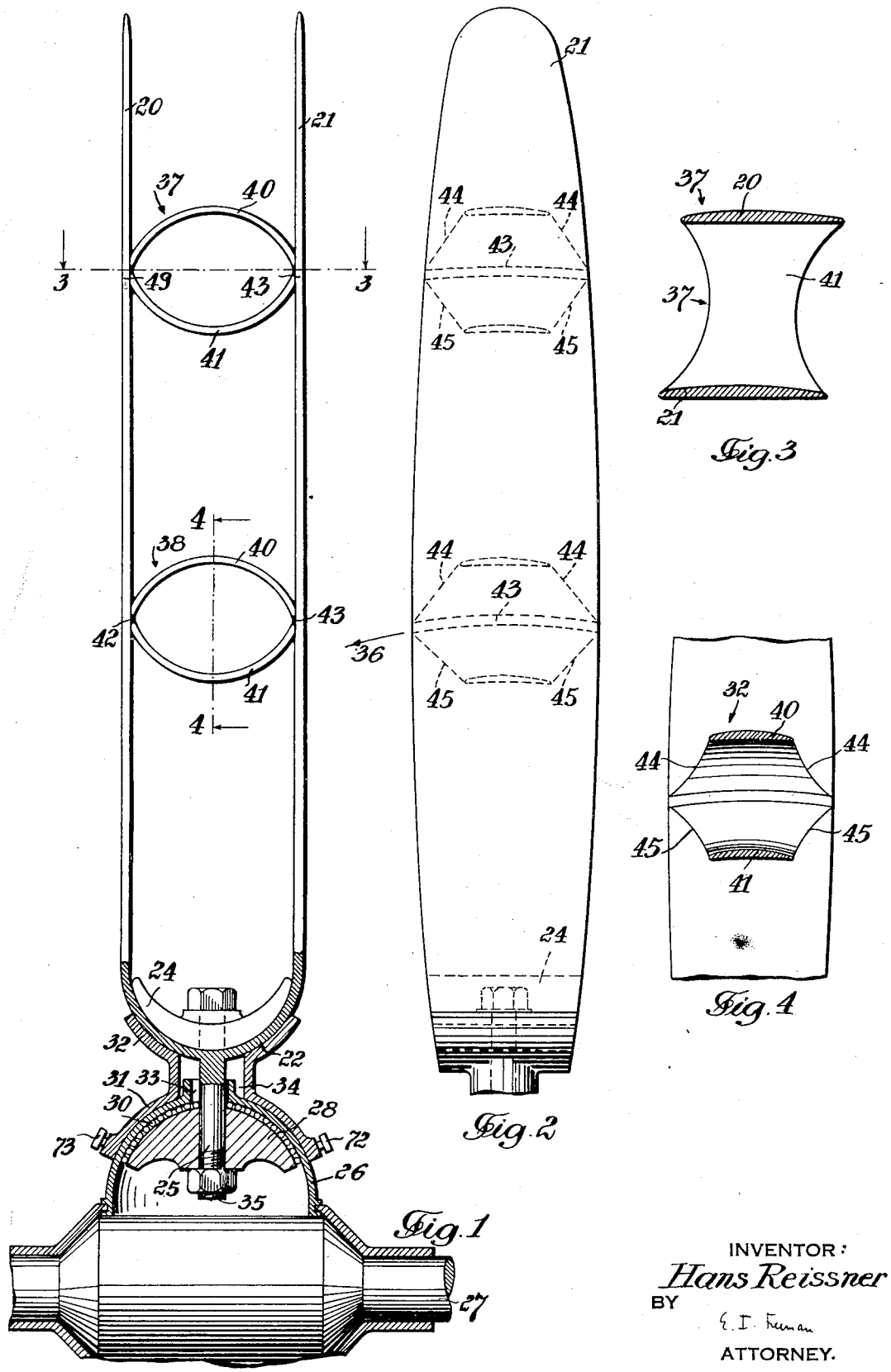
INVENTOR:
Hans Reissner
BY
ATTORNEY.

March 14, 1944.  H. REISSNER  2,344,266
AIRCRAFT PROPELLER CONSTRUCTION
Filed June 27, 1941  3 Sheets-Sheet 2
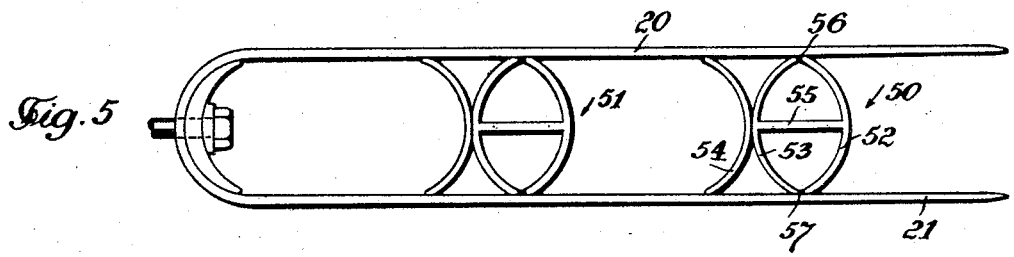
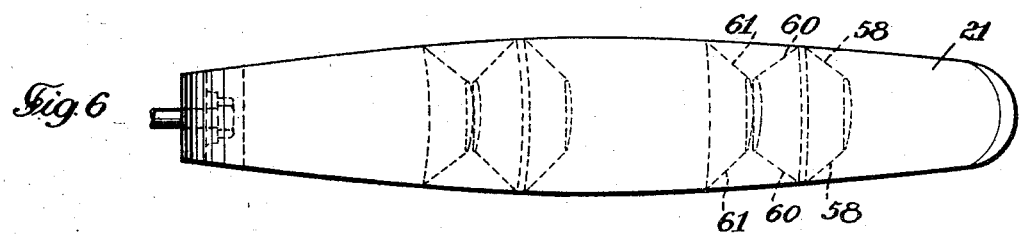
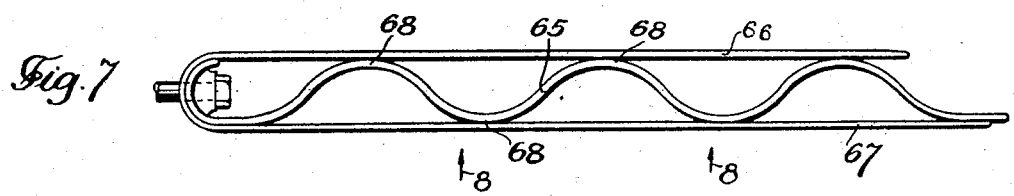
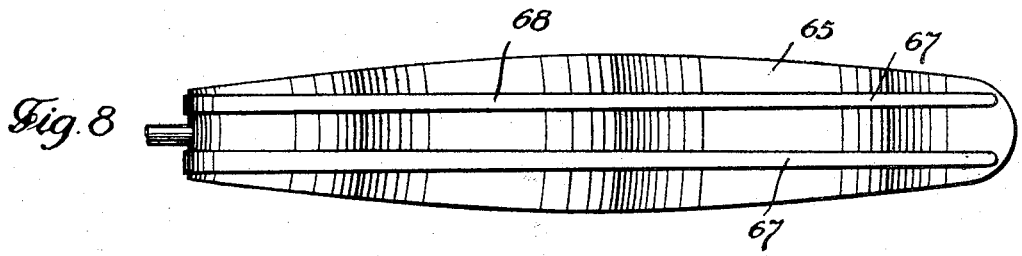
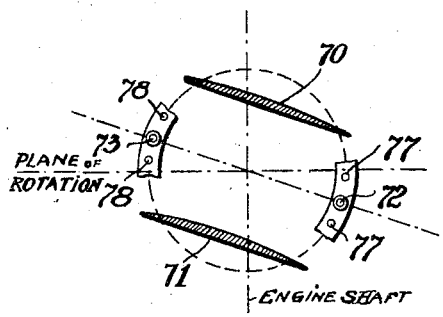
INVENTOR:
Hans Reissner
BY
G. I. Furman
ATTORNEY

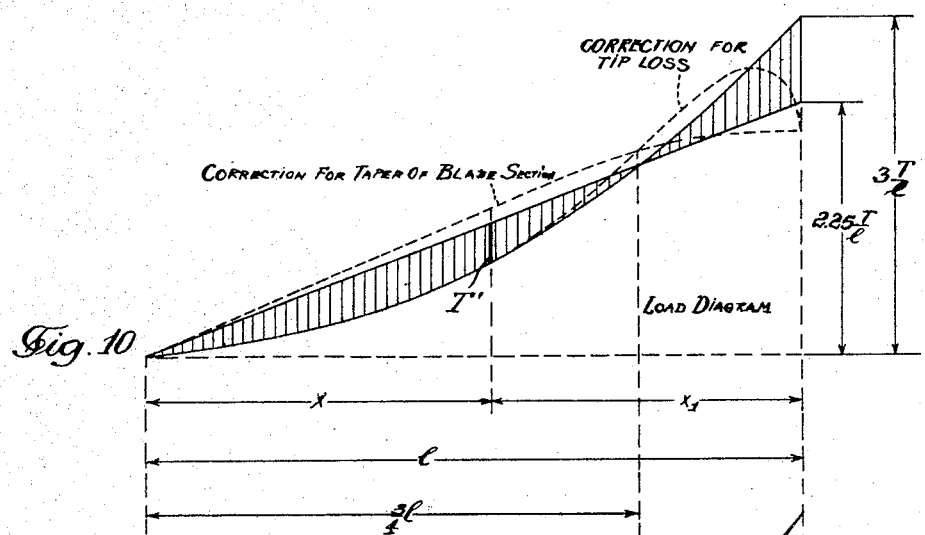
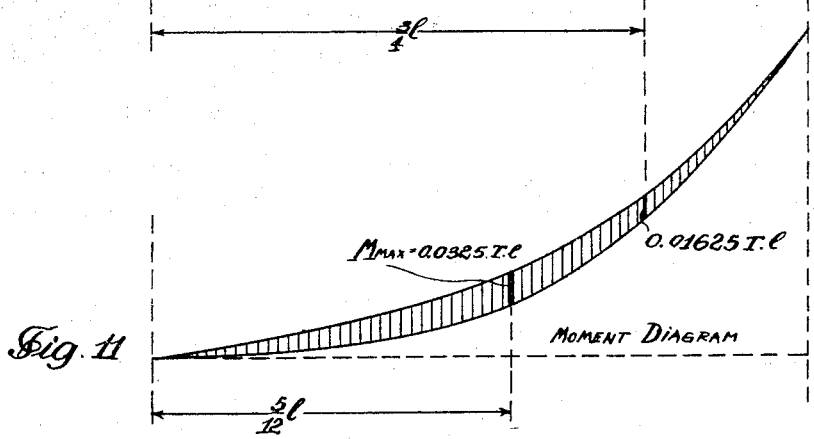
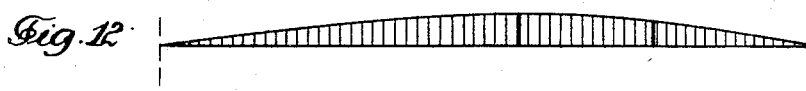
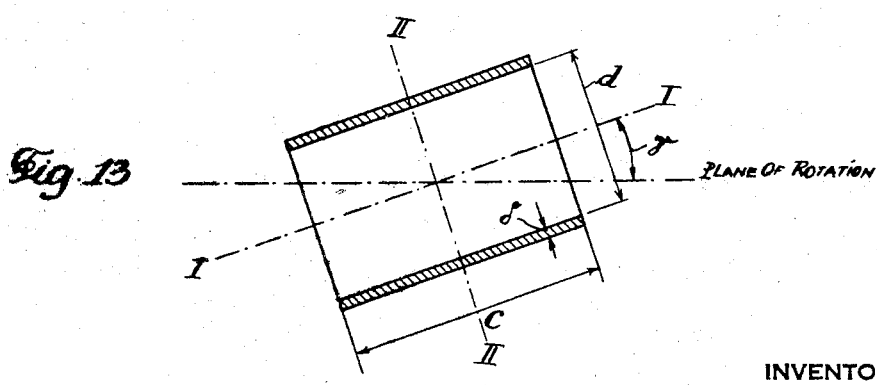

Patented Mar. 14, 1944

2,344,266

UNITED STATES PATENT OFFICE 2,344,266

AIRCRAFT PROPELLER CONSTRUCTION

Hans Reissner, Chicago, Ill.

Application June 27, 1941, Serial No. 399,963

14 Claims. (Cl. 170—162)

This invention relates to propellers adapted for use with aircraft and more particularly to a novel composite propeller construction.

Air screws as used nowadays are designed for the increasing engine power and the increasing blade speed of modern aircraft. However, the customary propeller constructions have various drawbacks such as their excessive weight and a correspondingly high centrifugal force. Due to the great difference of the principal moments of inertia of the blade sections high centrifugal couples are set up. The necessary thickness of the customary propeller blades causes a loss of efficiency of the propeller in case the speed of some sections of the blades approaches the velocity of sound. Besides, the customary propeller constructions offer little resistance against torsional as well as bending vibrations.

In accordance with my invention these drawbacks are removed. The propeller of the invention is designed for use with any kind of aircraft, such as airplanes, helicopters, Autogiros and the like. My improved propeller has twin or biplane blades which are preferably bent from a single blade of double length having their connecting portion at the propeller hub.

The two spaced propeller blades may have either no stagger at all or a very small stagger. A small stagger of the blades gives a useful small overbalance which can overcome the average aerodynamic moment. Besides, the principal axis of inertia of minimum moment of inertia of the twin blade is arranged at such an angle with the plane of rotation that the centrifugal torque is zero at a pitch corresponding to the average flight position. However, if the stagger becomes too large the centrifugal couples are overbalanced too much. The propeller may also be overbalanced by means of counterweights arranged on the propeller hub. However, a propeller with staggered blades has the advantage that the centrifugal torque about the blade axes is not transmitted to the hub and that it has less weight than a propeller provided with counterweights.

The two blades of the propeller are connected together by light weight stiffener members of suitable strength and shape designed to resist the centrifugal forces. They also have a shape to produce the least possible air resistance. To this end the stiffener members are arc shaped to take the centrifugal forces substantially without bending in uniform tension and compression. Besides, the stiffener members are also curved along the relative air flow to reduce their air resistance. Hence, it will be evident that the stiffener members have a torus shape. These stiffener members serve to give the composite propeller blade of the invention a torsional stiffness sufficient to counteract the change of the pitch angles. They are also designed to unite the blades to one body having substantially equal principal moments of inertia and to intercept the centrifugal couples and the blade torque on their way from the tip of the blade towards the root. Hence, torsional stresses of the blade as well as deformations of the spaced blade sections between the stiffener members are greatly reduced. Furthermore, the stiffener members annul entirely the centrifugal couples at the root of the blade.

The stiffener members used for the twin blade construction of the invention increase also the bending stiffness of the composite propeller so that it is higher than that of the single blade components. It is, however, feasible to omit the stiffener members. This construction requires stiffer blades to resist vibrational forces.

The composite propeller of the invention has only about half the width of the customary monoplane blade construction, and hence its air drag is not greater than the one of a corresponding propeller of prior design. Of course the stiffening members produce an additional air drag which slightly increases the total air resistance of my improved blade construction. However, this small drawback is balanced by the advantages gained by my improved propeller construction. My improved composite air screw has a blade that is much thinner than the customary propeller blades, and therefore its weight is very much reduced. Hence, it will be obvious that the efficiency of my improved composite air screw may be used for higher velocities without loss of efficiency.

A preferred embodiment of the invention comprises a twin or biplane blade connected together by two stiffening members. Each of the two stiffening members preferably consists of two arc shaped members connected to each other to form a tube and bent along a circle having its center in the axis of rotation of the propeller. Instead of forming each stiffener of two arc shaped members the stiffener may consist of three bent sections which take up the centrifugal forces by their arched form without producing bending moments. A radial reinforcing wall may be arranged midway between the stiffeners and parallel to the two blades.

In order to improve the aerodynamic efficiency of the twin blades they preferably have a tapered cross section. As viewed in a longitudinal section the blades may also have a linear taper in thickness from the point of maximum bending moment towards their tip. The blades may have a constant section from the point of maximum bending moment to the root of the blades, the reason being that though the bending forces decrease towards the root, the centrifugal stresses increase, and the total stresses are such that it is practical to leave these blade sections constant.

Alternatively, the propeller of the invention may consist of a single corrugated blade. The corrugations of the blade are curved along circles about the axis of rotation of the propeller. The corrugated single blade is reinforced against torsion, bending and centrifugal loads by two pairs of metal strips touching the corrugated blade at its outwardly curved portions. The two pairs of reinforcing metal strips counteract the effect of the centrifugal forces as well as bending and torsional moments.

The propeller construction with a single corrugated blade reinforced by metal strips may be considered as the inversion of the propeller construction of twin blades having tube or arc shaped stiffener members. The corrugated blade may be developed from the tube shaped stiffener member and the reinforcing strips as a degeneration of the two blades.

The propeller of the invention is preferably hinged by means of a single bolt in the propeller hub which provides a particularly simple connection between the blade system and the hub bearings. This construction permits turning movements of the propeller about its longitudinal axis as well as about transverse axes. The novel design of my propeller brings down its weight as well as the centrifugal force to less than half of the lightest weight and centrifugal force which can be attained with the best prior constructions.

It is accordingly an object of my invention to provide an improved propeller construction having less weight than prior propellers and having thinner blades with a corresponding higher efficiency.

Another object of the invention is to provide a composite propeller the longitudinal aggregates of which have principal moments of inertia of substantially equal order of magnitude.

Still another object of the invention is to provide a propeller consisting of twin or biplane blades held together by stiffener members of suitable shape and strength.

A further object of the invention is to provide a propeller consisting of two opposed blades which are held together by stiffener rings bent along circles about the center of rotation of the propeller.

Still another object of the invention is to provide a propeller consisting of a corrugated blade, the corrugations of which are curved along circles about the axis of rotation of the propeller and reinforced by parallel metal strips.

These and further objects of the invention will become more apparent when the description proceeds, taken in connection with the drawings, wherein:

Fig. 1 is a side elevational veiw of a propeller in accordance with the invention, the propeller hub being shown in section.

Fig. 2 is a front elevational view of the propeller of Fig. 1.

Fig. 3 is a sectional view taken along the line 3—3 of Fig. 1.

Fig. 4 is a sectional view taken along the line 4—4 of Fig. 1.

Fig. 5 is a side elevational view on a reduced scale of a modification of the invention illustrating a modified stiffener construction.

Fig. 6 is a front elevational view of the propeller of Fig. 5.

Fig. 7 is a side elevational view on a reduced scale of still another modification of the invention illustrating a corrugated single blade with reinforcing metal strips.

Fig. 8 is a front elevational view taken as indicated by the arrows 8, 8 of Fig. 7.

Fig. 9 is a cross sectional view of a modification of the invention showing counterweights disposed on the blade roots.

Fig. 10 shows curves to explain the load diagram of a propeller in accordance with the invention.

Fig. 11 shows curves to illustrate the moment diagram of my improved propeller.

Fig. 12 is a curve showing the results of the curves of Fig. 11 referred to rectangular coordinate axes.

Fig. 13 is a schematical cross sectional view of a twin blade propeller used for a calculation of the moments of inertia.

Referring to the drawings, and more particularly to Figs. 1 to 4, my improved propeller comprises two substantially parallel blades 20 and 21 spaced apart and connected together at the propeller hub as indicated at 22. It may be pointed out that the distance of blades 20 and 21 from each other with respect to their length is exaggerated in the drawings. As clearly shown in Fig. 3 the cross section of blades 20 and 21 is tapered to improve their aerodynamic efficiency. Furthermore, blades 20 and 21 may have a slight stagger indicated in Fig. 3 for a purpose which will become more apparent hereinafter. Blades 20 and 21 need not have equal chord length and thickness.

The root of the propeller blades is reinforced by a cylindrical member 24 and is connected with bolt 25, extending through spherical hub member 26. Hub member 26 is secured to propeller shaft 27 driven by the engine of the aircraft. Bolt 25 is integral with or secured to spherical member 28. A ball bearing indicated at 30 is provided between spherical member 28 and hub member 26. Spherical shell 31 is integral with reinforcing member 32 and is rigidly connected with propeller root 22 and reinforcing member 24. Hence, it will be seen that members 28 and 31, arranged in nested relationship rotate as a unit with respect to hub member 26 secured to propeller shaft 27.

Ball bearing 30 permits a turning movement of propeller blades 20, 21 about their longitudinal axis. Besides, there is a certain clearance between bolt 25 and hub member 26 as indicated at 33, and between hub member 25 and spherical members 31, 32 as shown at 34. Clearance spaces 33 and 34 allow a certain tilting movement of the propeller blades about transverse axes in a counterclockwise direction as viewed in Fig. 1. Due to the nested spherical shells 28, 26, 31, propeller blades 20, 21 are hinged about a center indicated at 35 being the center of spherical shells 28, 26 and 31. The propeller rotates in the plane of Fig. 1 and in the direction indicated by arrow 36 of Fig. 2.

The enforcement of the pitch angles of the propeller blades in the spherical bearing described hereinabove is not shown in this application. The propeller pitch may be held in its desired position in various ways, some of which are disclosed in my British Patent #499,932.

The two blade sections 20 and 21 are connected by two arched stiffener members generally indicated at 37 and 38. As shown in the drawings arched stiffener members 37 and 38 are arranged in the middle portion of the blades. However, it may have advantages to place stiffener member 37 at the tip of blades 20 and 21. In this case inertia dampers may be used, i. e. little balls arranged to swing in a cavity at the blade tip.

Stiffener members 37 and 38 each have the shape of two combined parabolic tension and compression arches. Hence, they do not experience any bending moment by their centrifugal forces, and their thrust reactions on blades 20, 21 balance each other. Each stiffener member 37 and 38 consists of two curved portions 40 and 41, connected with blades 20 and 21 by two welds indicated at 42 and 43. As clearly shown in Fig. 2 welds 42 and 43 are curved along circles having their centers in the axis of rotation of the propeller. Stiffener portions 40 and 41 have a corresponding curvature. Besides stiffener members 37 and 38 have a tapered cross section shown in Figs. 2 and 4 to improve their aerodynamic efficiency. The outer edges of stiffener members 37 and 38 are cut away in an oblique direction as indicated at 44 and 45 in Figs. 2 and 4. It will be obvious that stiffener tubes 37 and 38 are curved along the path of the relative air flow to reduce the air resistance of the propeller.

Another embodiment of the invention is shown on a reduced scale in Figs. 5 and 6. Blades 20 and 21 are constructed in the same manner as described in connection with Figs. 1 to 4. Also the propeller has the same hinge connection with the hub which, for the sake of clarity, has not been shown. The propeller of Figs. 5 and 6 has two stiffener members 50 and 51 of a modified construction. Each of the stiffener members comprises three bent portions 52, 53 and 54 the construction of which will be evident from an inspection of Figs. 5 and 6. Stiffener portions 52 and 53 are connected together by reinforcing wall 55 arranged parallel to the surfaces of blades 20 and 21. Reinforcing wall 55 serves to diminish the bending moment in weld joints 56 and 57. Welds 56 and 57 also are curved as described in the embodiment of the invention shown in Figs. 1 to 4. The stiffener members have oblique cut away end portions indicated at 58, 60 and 61.

Still another modification of the invention is shown in Figs. 7 and 8. The construction shown therein may be said to be the inversion of the propeller shown in Figs. 1 to 4. The propeller consists of a single corrugated blade 65 which may be considered as a development of the stiffener members described hereinabove. Corrugated blade 65 is reinforced by two pairs of strips 66, 66 and 67, 67. Strips 66, 66 and 67, 67 are welded to corrugated blade 65 as indicated at 68 along the outwardly curved blade portions. Reinforcing strips 66, 66 are shorter than strips 67, 67. As shown in Fig. 8 the corrugations of blade 65 are again curved along circles about the axis of rotation of the propeller.

It may be mentioned here that blades 20 and 21 as well as reinforcing strips 66 and 67 may be tapered towards the propeller tips from a certain part where the bending moment has its maximum. However, for the sake of clarity this has not been shown in the drawings.

It is well known that three natural forces act on a rotating propeller. One of these forces is the torque or tangential reaction produced by the driving shaft. Besides, the air thrust or axial reaction act upon the propeller as well as the centrifugal forces produced by the rapid rotation of the propeller.

For the following mathematical calculations reference is made generally to Figs. 10 to 13.

We will now consider the load distribution over the entire length of the propeller which is shown in Fig. 10. The bending moment caused by torque or tangential reaction acting on the propeller is only ⅓ or ¼ of the bending moment caused by the air thrust. Hence, it is sufficient if we consider here only the thrust load and take account of the torque load by multiplying the result with the factor 1.3.

The parabolic load distribution of the air thrust is shown in Fig. 10 and designated with $T'$. $T$ designates the thrust and $$T' = \frac{dT}{dx}$$

Fig. 10 also shows the linear load distribution of the centrifugal force. The transverse load produced by the centrifugal load $$\frac{dC}{dx}$$

is equal to $C'\alpha$ wherein $C$ is the centrifugal force and $\alpha$ the angular deviation of the blades, $C'$ being equal to $$\frac{dC}{dx}$$

For an exact aerodynamic calculation the tip loss of the propeller caused by the air thrust and indicated by a dotted line in Fig. 10 would have to be taken into consideration. However, for a strength calculation the parabolic distribution given by the curve $T'$ is sufficiently accurate and on the safe side anyhow.

We will now consider the distribution of the bending moments. Only one reaction force $N_0$ acts on the hinge support of the blade amounting to $$N_0 = T - C\alpha \tag{1}$$

The $\alpha$ in Equation 1 is determined by the condition that the moment about the hinge is zero. Accordingly $$T \tfrac{3}{4} l = C\alpha \tfrac{2}{3} l$$

so that $$C\alpha = \frac{9}{8} T$$

and $$N_0 = \frac{T}{8}$$

In this equation $l$ indicates the total length of the blade as shown in Fig. 10. The last equation indicates that the reaction force $N_0$ acts in a direction perpendicular to the direction of the blade axis coinciding substantially with the direction of the thrust $T$.

The bending moment function is now given by $$M = -N_0 x + T' \tfrac{1}{3} x \cdot \tfrac{1}{4} x - \mu \omega^2 x \cdot \tfrac{1}{2} x \cdot \tfrac{1}{3} x \cdot \alpha$$

In this equation $M$ indicates the bending moment, $\mu$ the mass per unit of length of the propeller blade, $\omega x$ the angular speed of a propeller section and $x$ stands for the distance of a propeller section from the center of the spherical bearing as indicated in Fig. 10.

From the law of distribution shown in Fig. 10 it follows that:

$$T' = \frac{dT}{dx} = 3\frac{T}{l}\left(\frac{x}{l}\right)^2$$

and $$C' = \frac{dC}{dx} = \mu\omega^2 x = \frac{2C}{l}\frac{x}{l}$$

Hence one obtains for the bending moment $$M = \frac{T}{8}x + \frac{T}{l}\frac{x^4}{l^3}\frac{1}{12} - 2\frac{C}{l^2}\frac{x^3}{6}\alpha = \frac{Tl}{8}\left[\frac{x}{l} + 2\left(\frac{x}{l}\right)^4 - 3\left(\frac{x}{l}\right)^3\right] \quad (2)$$

The equation for the first derivative of C implies the assumption that the blade section is constant. Actually, as set forth hereinabove the blade tapers towards the tip at least in the outer portions thereof. As shown in Fig. 10, however, the correction for the taper of the blade section is counteracted to some extent by the tip loss produced by the air thrust.

Equation 2 gives $(M)_{x=0}$ and $(M)_{x=l}$ zero as it should be. The maximum occurs at the point $$\frac{x}{l} = \xi_m$$

which is given by the condition $$1 + 8\xi_m^3 - 9\xi_m^2 = 0$$

obtained by differentiating Equation 2 and putting the result equal to zero.

If we put $$\xi_m = 0.5 + \epsilon$$

where $\epsilon$ is supposed to be small one obtains $$\epsilon = -\frac{1}{12}$$

accordingly we obtain $$\xi_m = \frac{5}{12}$$

If we insert the value for $\xi_m$ thus obtained into Equation 2 we obtain the maximum of the bending moment:

$$M_{max} = \frac{Tl}{8}\left[\frac{5}{12} + 2\left(\frac{5}{12}\right)^4 - 3\left(\frac{5}{12}\right)^3\right] = 0.0325 \cdot T \cdot l \quad (2a)$$

The corresponding bending moment for a propeller blade fixed at the blade root would be $$(M_{max}) \text{ fix.} = T\frac{3}{4}l(1-K)$$

wherein $K$ is a certain centrifugal restoring factor which we may assume to be 25%.
Then $$(M_{max}) \text{ fix.} = 0.563\ Tl$$

Hence the relation between the two moments for a fixed propeller and a hinged propeller is $$\frac{(M_{max}) \text{ fixed}}{(M_{max}) \text{ hinged}} = \frac{0.563}{0.0325} = 17.5 \quad (3)$$

The bending moment diagram is given in Fig. 11 and consists of a straight line and two parabolas of the fourth and the third degree. The shaded area of Fig. 11 has been shown once again in Fig. 12 for convenience. Fig. 12 clearly shows the maximum of the bending moment occurring at the point $$x = \frac{5}{12}l$$

We will consider the centrifugal couples acting on the blades. In accordance with the invention the centrifugal couples substantially balance each other. For the further calculation reference is made of Fig. 13 showing a schematic cross section of the blade. The blade has been shown with the same wall thickness throughout its width for the sake of simplicity. It is to be understood, however, that the blade has actually a tapered cross section as clearly shown in Fig. 3.

We assume that the blade section consists of two thin sheets fixed at a certain distance from each other and having a small stagger. The centrifugal couple $dM$ is $$dM = \zeta\omega^2 S dx k_{xy}$$

where $\zeta$ is the density of the blade material, S the total area of the cross section, $dx$ an element of radial length and $k_{xy}$ is given by $$k_{xy}^2 = \frac{I_{xy}}{S} = (I_I - I_{II})\frac{\sin(2\gamma)}{2}$$

$k_{xy}$ stands for the centrifugal radius of gyration, $\gamma$ is the angle of deviation of the principal axis I from the plane of rotation as indicated in Fig. 13.

For the first approximation given hereinafter we may neglect the camber of the blade sheets which is equal to about 2%. Then we obtain for the dynamic moments of inertia taken with regard to the axes I, II shown in Fig. 13, $$I_I = \zeta\frac{S}{2}\frac{d^2}{2} = \frac{\zeta c \delta d^2}{2}$$

$$I_{II} = \zeta S\frac{c^2}{12} = \zeta\frac{\delta c^3}{6}$$

$$(I_I - I_{II})\frac{\sin(2\gamma)}{2} = \zeta c \delta\left(\frac{d^2}{2} - \frac{c^2}{6}\right)\frac{\sin(2\gamma)}{2} \quad (4)$$

In this equation $d$ indicates the distance between the two blades and $\delta$ means an average thickness of the blade sheets because the blade sections are actually tapering in thickness on both edges as explained hereinabove. $c$ stands for the width of the blades. $d$, $c$ and $\delta$ are shown in Fig. 13.

If it is demanded that the centrifugal couple $dM$ and therefore $k_{xy}$ shall be zero, then we have to make $$\frac{d^2}{2} - \frac{c^2}{6} = 0$$

or $$d = c\sqrt{\frac{1}{3}} = 0.5775c \quad (5)$$

It may be advantageous to demand a certain overbalance of the centrifugal couple to counteract the average aerodynamic couple about the aerodynamic center. The average aerodynamic couple also acts in the sense towards lower pitch of the blade. Hence we must demand an overbalance towards higher pitch. Then we obtain the following equation:

$$dx\omega^2\zeta c\delta\left(\frac{d^2}{2} - \frac{c^2}{6}\right)\frac{\sin(2\gamma)}{2} = C_{M.a.c.}\frac{\zeta_{atm.}}{2}V^2 c^2 dx$$

In this equation $C_{M.a.c.}$ indicates the coefficient of couple of the aerodynamic forces about the aerodynamic center of the blade corresponding to the windward quarter point. $\zeta_{atm.}$ indicates the density of the air. $V$, the relative velocity of the air, is given by the following equation:

$$V^2 = \omega^2 x^2 + \omega^2 = \frac{\omega^2 x^2}{\cos^2\gamma}$$

Hence $$\zeta\delta\left(\frac{d^2}{2} - \frac{c^2}{6}\right)\sin(2\gamma) = C_{M.a.c.}\zeta_{atm.}\frac{x^2 c}{\cos^2\gamma}$$

If we put $\sin(2\gamma) = 2 \sin \gamma \cos \gamma$ the following equation is obtained:

$$\delta\left(\frac{d^2}{2} - \frac{c^2}{6}\right) = C_{M,a.c.} \cdot \frac{\zeta_{atm.}}{\zeta} \cdot \frac{x^2 c}{2 \sin \gamma \cos^3 \gamma} \quad (6)$$

If for an example we take the following figures $$C_{M,a.c.} = 0.07, \frac{\zeta_{atm.}}{\zeta} = \frac{1}{8000}, \gamma = 45°, x = 0.8m,$$

$$c = 0.15m, \delta = 0.004m$$

we obtain $$d^2 - \frac{c^2}{3} = \frac{0.14}{8} 10^{-3} \frac{0.64}{0.004} 0.152$$

$$= 0.00084$$

$$d^2 = \frac{0.15^2}{3} + 0.00084 = 0.00834, d = 9.12 \text{ cm.}$$

On the other hand, the inertia balancing alone would demand $$d_{in.} = 0.5775, c = 8.66 \text{ cm.}$$

in accordance with Equation 5.

Hence, it will be evident that an increase of the distance between the blade sheets of .46 cm. would be sufficient to overbalance the blade system against the maximum aerodynamic forces. As is evident from Equation 6 this increase of the gap between the blades would even overbalance the aerodynamic couples in higher altitudes, where $\zeta_{atm.}$ is smaller.

This result further shows that the gap between the twin blades of the propeller for a complete couple balance may be smaller than is desirable for maximum efficiency of the propeller. On the other hand, if the gap between the blades is made greater this would produce an overbalance, viz. a couple tending to turn the blade faces parallel to the driving shaft axis or into the feathering position.

This tendency to produce an overbalance can be overcome in various ways. To this end the blades may have a small stagger. Alternatively, counterweights may be provided in the propeller hub as shown in Fig. 9. Here the two blades have been indicated by 70 and 71 and the two counterweights by 72 and 73. Counterweights 72 and 73 are arranged on a radius transverse to the blade centroids and the driving shaft and on or near the axis $x$ of the greater moment of inertia of the blade system. Line 74 indicates the driving shaft axis and line 75 the plane of rotation of the propeller. Counterweights 72 and 73 may be arranged in any convenient portion of the propeller hub as shown e. g. in Fig. 1. Here counterweights 72 and 73 are screwed into spherical shell 31 so that they rotate in unison with blades 20 and 21. In order to adjust the position of counterweights 72, 73 holes 77 and 78 are provided in spherical shell 31 as shown in Fig. 9. Thus, counterweights 72, 73 are easily accessible without the necessity to take the bearing apart.

The distance between blades 70 and 71 and their stagger, i. e. the relative displacement of the blades along their chords, may be chosen in such a manner that one of the principal axes of inertia, $x$ or $y$ coincides with the plane of rotation 75 of the propeller when the blade is in a pitch position median between the extreme pitch position of the propeller corresponding to the take off and the top speed of the aircraft. Preferably, the principal axis $y$ of the minimum moment of inertia of the blade system should be located in the plane of rotation 75 of the propeller. Instead of staggering blades 70 and 71 counterweights 72 and 73 may be used to locate axis $y$ in the plane of rotation 75 in an intermediate pitch position of the propeller.

We will now calculate the stresses, dimensions and the weight of the new composite propeller. Each of the two blade sections shown e. g. in Figs. 1 to 4 shall support about half of the bending moment shown in Fig. 11 and besides the centrifugal stress.

Calculations have shown that at the most two such stiffener members are sufficient to produce the required torsional stiffness of the blades between the stiffener members. Each stiffener member transmits only two equal opposite forces through the weld joints so that the torsional couple is intercepted and annulled from the weld joint to the propeller root. The stiffener members therefore serve to outbalance the inertia and the aerodynamic couples each for the blade length from the stiffener member towards the blade tip or between two stiffener members. Besides, they serve to maintain the desired twist or pitch angles of the blades.

The blades may have a linear taper in longitudinal section from the point of maximum bending moment $M_{max}$ shown in Fig. 11 to the blade tip. The blades may have a constant section from the point of maximum bending moment to the root of the blade. The twist of the blades along their longitudinal axes can be made permanent by stretching the outer blade edges. This may be done by squeezing the outer blade edges between rollers gradually towards the blade center lines.

The total stress $\sigma$ at the point of maximum bending moment in each of the blades is given by the following equation.

$$\sigma = \frac{M_{max}}{c\delta^2/6} + \frac{\zeta \omega^2 x_1^2}{6} \; ; \; x_1 = l - x$$

In this equation $x_1 = l - x$ and $M_{max}$ is equal to $0.0325\, Tl$ in accordance with Equation 2a. Besides, we will assume that $T_{max}$ is 250 kg. for each blade and $l$ is 160 cm. The distance from the blade tip to the point of maximum bending moment is $$x_1 = \frac{7}{12l} = \frac{7 \cdot 160}{12} = 93.5 \text{ cm.}$$

and hence $$\sigma = \frac{7870}{\delta^2 c} + 160 \text{ kg./cm.}^2$$

The total stress allowable for high alloy steel is $\sigma$ all. $= 2500$ kg./cm.$^2 = 35.000$ lbs./sq. in. Furthermore, we assume the blade width to be $c = 15$ cm. Hence one obtains $$\delta^2 c = \frac{7870}{2340}$$

and $$\delta = 0.47 \text{ cm.}$$

For magnesium alloy having an allowable stress of about one quarter of that of steel the blade thickness would have to be $$\delta_{magn.} = 2 \cdot 0.47 = 0.94 \text{ cm.}$$

Thus it will be seen that magnesium alloy would give a lighter but thicker blade which is not as efficient at high velocities and which is not as safe for welding in the stiffener members.

If we make the blade section constant from a section considered to the root at about $x_1=140$ cm. where the bending moment is zero the stress then would be $$\sigma = 160 + \gamma\omega^2\frac{46^2}{2} = 160 + \frac{7.8 \cdot 10^{-3}}{981} 22{,}500 \cdot 23 \cdot 46$$

$$= 349 \text{ kg./cm.}$$

This very small value may be increased somewhat on account of the hole in the blade root necessary to take the bolt connecting the propeller with the hub. The weight of the propeller can then be estimated to $$W = 2 \cdot 7.8\left(46.5 + \frac{1}{2} 93.5\right) 15 \cdot 0.45 = 9{,}800 \text{ gr.}$$

$$= 9.8 \text{ kg.} = 20.9 \text{ lbs.}$$

If we take into consideration the two tube-shaped stiffener members having a diameter of 15 cm., a thickness of .2 cm. and a length of 15 cm., the weight of the propeller would be increased by the following factor:

$$W = 2\pi \cdot 15 \cdot 0.2 \cdot 15 \cdot 7.8 \text{ gr.}$$
$$= 2.205 \text{ kg.} = 4.9 \text{ lbs.}$$

The centrifugal force acting on the outer stiffener member arranged at a radius of say 100 cm. would be $$C_{st.} = \frac{1.1025}{9.81} 22500 \cdot 1 \text{ kg.} = 2530 \text{ kg.} = 5630 \text{ lbs.}$$

This centrifugal force would have to be taken by a weld area of $$A = 2 \cdot 15 \cdot 0.5 \text{ cm.}^2 = 15 \text{ cm.}^2$$

This would give a stress in the weld of the stiffener member of $$\sigma = \frac{2530}{15} = 168.4 \text{ kg./cm.}^2 = 2406 \text{ lbs./sq. in.}$$

A single hinged blade of double width calculated by a corresponding method would give the same thickness and the same weight as the twin blade construction of the invention. Only the stiffener members would not be required for a single hinged blade. On the other hand, the disadvantages of a single blade would be the lesser resistance against bending and torsional vibration and its lack of centrifugal couple balance. Besides, it would be more difficult to fasten the hinge bearing bolt to the propeller hub.

The total weight of the composite propeller construction of the invention figured above is equal to $$W_{tot.} = 20.9 + 4.9 = 25.8 \text{ lbs.}$$

This value compares favorably to the standard weight of a propeller blade fixed and clamped at the root which amounts to more than 70 lbs. Besides, the centrifugal and bending forces exerted on the hub of a propeller of the invention are much smaller.

The centrifugal force of a hinged blade figured from the stress at the propeller root would be $$C_{st} = 561 \cdot 0.47 \cdot 30 = 7600 \text{ kg.} =$$
$$16{,}900 \text{ lbs.} + 8450 \text{ lbs.} = 25{,}350 \text{ lbs.}$$

In contradistinction the centrifugal force for a fixed and clamped propeller blade would be between 90,000 and 100,000 lbs.

Various changes and modifications may be made to the details of construction of the invention without departing from the broader spirit and scope thereof, as set forth in the following claims.

I claim:

1. A propeller particularly for aircraft comprising a hub, twin blades mounted on the said hub, each blade being directly supported thereon, the blades having airfoil shaped cross sections extending in a substantially parallel relation to each other on both sides of the plane of rotation passing through the hub center, being located in spaced relation from each other at such a distance that the combined principal moments of inertia of both blades are of substantially equal order of magnitude though varying in the longitudinal direction of the blades, and means to permanently maintain the said relations of the cross sections during operation of the propeller.

2. A propeller particularly for aircraft comprising a hub, a plurality of twin blades mounted on the said hub, each blade being directly supported thereon, the blades having airfoil shaped cross sections extending in a substantially parallel relation to each other on both sides of the plane of rotation passing through the hub center, being located in spaced relation from each other at such a distance that the combined principal moments of inertia of both blades are of substantially equal order of magnitude though varying in the longitudinal direction of the blades, and means distributed throughout the operating length of the blades to permanently maintain the said relations of the cross sections during the operation of the propeller.

3. A propeller particularly for aircraft comprising a hub, a plurality of twin blades mounted on the said hub, each blade being directly supported thereon, the blades having airfoil shaped cross sections extending in substantially parallel relation to each other on both sides of the plane of rotation passing through the hub center, being located in spaced relation from each other at such a distance that the combined principal moments of inertia of both blades are of substantially equal order of magnitude though varying in the longitudinal direction of the blades, and a plurality of stiffeners connecting the twin blades distributed throughout the entire operating length of the blades to permanently maintain the said relations of the cross sections during operation of the propeller.

4. A propeller particularly for aircraft comprising a hub, a plurality of twin blades mounted on the said hub, each blade being directly supported thereon, the blades having airfoil shaped cross sections extending in a substantially parallel relation to each other on both sides of the plane of rotation passing through the center of the hub, a plurality of stiffeners distributed throughout the operating length of the blades, connecting the twin blade cross sections in such a manner that in the cross sectional plane of the stiffeners the twin blades form a one body cross section, the blades being located between two adjacent stiffeners in spaced relation from each other at such a distance that the circumferential centrifugal components of the twin blades between the said stiffeners produce reactions which come into equilibrium inside each stiffener by means of substantially equal principal moments of inertia in each combined cross section between each pair of stiffeners.

5. A propeller particularly for aircraft comprising a hub, a plurality of twin blades mounted on the said hub, each blade being directly supported thereon, the blades having airfoil shaped cross sections extending in a substantially parallel relation to each other on both sides of the plane of rotation passing through the hub center, being located in spaced relation from each other at such a distance that the combined principal moments of inertia of both blades are of substantially equal order of magnitude though varying in the longitudinal direction of the blades, and tube-shaped hollow stiffeners connecting the twin blades distributed throughout the operating length of the blades to permanently maintain the said relations of the cross sections during the operation of the propeller.

6. A propeller particularly for aircraft comprising a hub, a plurality of twin blades mounted on the said hub, each blade being directly supported thereon, the blades having airfoil shaped cross sections extending in a substantially parallel relation to each other on both sides of the plane of rotation passing through the hub center, being located in spaced relation from each other at such a distance that the combined principal moments of inertia of both blades are of substantially equal order or magnitude though varying in the longitudinal direction of the blades, tube-shaped hollow stiffeners connecting the twin blades distributed throughout the operating length of the blades, fastened to the blades on diagonally opposite sides of the circumference of the tube, whereby a radially extending outer and a radially extending inner tube wall section is formed, the outer wall of the said stiffener tubes being shaped as a catenary and the inner wall as an inverted catenary in correspondence to their own centrifugal forces, the inward thrust of the outer wall counterbalancing the outward thrust of the inner wall, the said tube-shaped stiffeners being adapted to permanently maintain the said relations of the cross sections during the operation of the propeller.

7. A propeller particularly for aircraft comprising a hub, a plurality of twin blades staggered with regard to each other mounted on the said hub, each blade being directly supported thereon, the blades having airfoil shaped cross sections extending in a substantially parallel relation to each other on both sides of the plane of rotation passing through the hub center, being located in spaced relation from each other at such a distance that the combined principal moments of inertia of both blades are of substantially equal order of magnitude though varying in the longitudinal direction of the blades and means distributed throughout the operating length of the blades to permanently maintain the said relations of the cross sections during the operation of the propeller.

8. A propeller particularly for aircraft comprising a hub, a plurality of twin blades mounted on the said hub, each blade being directly supported thereon, the blades having airfoil shaped cross sections extending in a substantially parallel relation to each other on both sides of the plane of rotation passing through the hub center being located in spaced relation from each other at such a distance that the combined principal moments of inertia of both blades are of slightly different order of magnitude though varying in the longitudinal direction of the blades, means to counteract the thus created overbalance of the principal moments of inertia, and means to permanently maintain the said relations of the cross sections during the operation of the propeller.

9. A propeller particularly for aircraft comprising a hub, a plurality of twin blades mounted on the said hub, each blade being directly supported thereon, the blades having airfoil shaped cross sections extending in a substantially parallel relation to each other on both sides of the plane of rotation passing through the hub center, being located in spaced relation from each other at such a distance that the combined principal moments of inertia of both blades are of slightly different order of magnitude though varying in the longitudinal direction of the blades, counterweights on the roots of each of the said twin blades placed in diagonally opposite relation to counteract the thus created overbalance of the principal moments of inertia, and means to permanently maintain the said relations of the cross sections during the operation of the propeller.

10. A propeller particularly for aircraft comprising a hub, a plurality of twin blades tiltably mounted on the said hub about transverse propeller axes, each blade being directly supported on the said hub, the blades having airfoil shaped cross sections extending in a substantially parallel relation to each other on both sides of the plane of rotation passing through the hub center, being located in spaced relation from each other at such a distance that the combined principal moments of inertia of both blades are of substantially equal order of magnitude though varying in the longitudinal direction of the blades, and means to permanently maintain the said relations of the cross sections during the operation of the propeller.

11. A propeller particularly for aircraft comprising a hub, a plurality of twin blades tiltably mounted thereon about transverse propeller axes, each blade being directly supported on the said hub, the blades having airfoil shaped cross sections extending in a substantially parallel relation to each other on both sides of the plane of rotation passing through the hub center, being located in spaced relation from each other at such a distance that the combined principal moments of inertia of both blades are of substantially equal order of magnitude though varying in the longitudinal direction of the blades, means to permanently maintain the said relations of the cross sections during the operation of the propeller, a spherical hub member adapted to be mounted on the propeller shaft, and a spherical bearing inside of the side spherical hub member connected with and supporting the root of the said twin blades.

12. A propeller particularly for aircraft comprising a hub, a plurality of twin blades, tiltably mounted thereon about transverse propeller axes, each blade being directly supported on the said hub, the blades having airfoil shaped cross sections extending in a substantially parallel relation to each other on both sides of the plane of rotation passing through the hub center, being located in spaced relation from each other at such a distance that the combined principal moments of inertia of both blades are of substantially equal order of magnitude though varying in the longitudinal direction of the blades, means to permanently maintain the said relations of the cross sections during the operation of the propeller, a spherical hub member adapted to be mounted on the propeller shaft, and a spherical bearing inside of the said spherical hub member supporting the root of the said twin blades, a central pivot connecting the blade root and the said spherical bearing, a cylindrical reinforcing member interposed between blade root and spherical hub member having outflaring upper and lower end portions embracing the blade root and the spherical hub member, the upper end portions being connected with the blade root.

13. A propeller particularly for aircraft comprising a hub, a plurality of twin blades tiltably mounted thereon about transverse propeller axes, each blade being directly supported on the said hub, the blades having airfoil shaped cross sections extending in a substantially parallel relation to each other on both sides of the plane of rotation passing through the hub center, being located in spaced relation from each other at such a distance that the combined principal moments of inertia of both blades are of substantially equal order of magnitude though varying in the longitudinal direction of the blades, means to permanently maintain the said relations of the cross sections during the operation of the propeller, a spherical hub member adapted to be mounted on the propeller shaft, and a spherical bearing inside of the said spherical hub member supporting the root of the said twin blades, a central pivot connecting the blade root and the spherical bearing, a cylindrical reinforcing member interposed between blade root and spherical hub member having outflaring upper and lower end portions embracing the blade root and the spherical hub member, the upper end portions being connected with the blade root, each twin blade being formed from a single sheet and a reinforcing member inserted on the inner side of the blade root.

14. A propeller particularly for aircraft comprising a hub, a plurality of twin blades tiltably mounted thereon about transverse propeller axes, each blade being directly supported on the said hub, the blades having airfoil shaped cross sections extending in a substantially parallel relation to each other on both sides of the plane of rotation passing through the hub center, being located in spaced relation from each other at such a distance that the combined principal moments of inertia of both blades are of substantially equal order of magnitude, though varying in the longitudinal direction of the blades, means distributed throughout the operating length of the blades to permanently maintain the said relations of the cross sections during the operation of the propeller.

HANS REISSNER.